2,694,673

CATALYTIC CRACKING OF HYDROCARBON OILS WITH SPECIFIC PORE SIZE SILICA-ALUMINA CATALYSTS

Charles N. Kimberlin, Jr., and Elroy M. Gladrow, Baton Rouge, La., assignors to Standard Oil Development Company, a corporation of Delaware No Drawing. Application October 21, 1950, Serial No. 191,511

3 Claims. (Cl. 196—52)

This invention relates to the catalytic conversion of hydrocarbon oils into lower boiling products and to improved catalysts for carrying out such conversions. More specifically, the invention pertains to the catalytic cracking of cyclic and/or acyclic gas oil range hydrocarbons in the presence of catalysts having optimum cracking activity for the specific type of feed stock involved. This optimum cracking activity is attained in accordance with the invention by adjusting average catalyst pore diameters within the approximate range of 20 to 120 Å. or higher as a function of the cyclic or acyclic character of the feed stock.

Processes for the catalytic cracking of relatively high-boiling hydrocarbon oils such as gas oils to form gasoline range hydrocarbons of high octane rating are well known in the art and have been used commercially for quite some time. Various types of useful catalysts have been developed, the most active of which include certain adsorbent materials such as natural or synthetic clays, composites of silica with alumina, magnesia and/or boria, etc. Also activated carbon and alumina have been used.

Prior to the present invention, it has also been discovered that pore size is one variable which strongly affects the activity of cracking catalysts made from synthetic silica gels containing other metal oxides, particularly alumina or magnesia, toward the formation of gasoline range hydrocarbons. In general, these discoveries seemed to indicate that cracking activity increases as catalyst pore diameter decreases. Thus, it has been suggested to improve the cracking activity of these gel-type catalysts by maintaining the pore diameters predominantly below about 20 Å., a minor proportion of the active pore volume having pore sizes up to 400 or 500 Å. The average pore diameter of the most widely used commercial cracking catalyst of the synthetic silica gel-alumina type is of the order of 20–40 Å. More recently, it has been disclosed that the selectivity of silica-alumina cracking catalysts toward the formation of gasoline range hydrocarbons may be improved by properly correlating the alumina content, specific surface, particle density and average pore diameter, the latter being maintained at least at 50 Å. and preferably between about 55 and 75 Å.

The beneficial influence of maintaining the pore diameter within the order of magnitude referred to above has been demonstrated at least qualitatively for feed stocks of different origin and composition. However, the degree of the improvement obtainable by controlling the pore diameter in this manner has been observed to vary appreciably for feed stocks of different composition. Heretofore, no explanation of these variations has been published nor has any method been disclosed for avoiding the same. As a result, many commercial cracking operations have been run at a relatively low efficiency. The present invention substantially alleviates this difficulty.

It has now been found that the cracking activity of porous cracking catalysts increases for cyclic feed stocks containing naphthenes and/or aromatics and decreases for acyclic feed stocks rich in paraffins, as the average pore diameter increases within the range of about 20–120 Å. More particularly, it has been discovered that the optimum pore diameter of cracking catalysts is about 50–120 Å. for cyclic hydrocarbons, particularly double ring naphthenes and aromatics and about 20–50 Å. for acyclic hydrocarbons of the paraffin series. These findings are illustrated by the experimental data tabulated below, which were obtained by subjecting cetane and decalin as individual feeds separately to cracking on the catalysts listed at 950° F., 0 p. s. i. g., and 2.0 v./v./hr. in fixed bed operation. The average pore diameter of the catalysts was calculated in a conventional manner by the equation $PD = (4\ v/s) \times 10^4$ where PD is the pore diameter in Angstrom units, $v$ the pore volume in cc. per gram and $s$ the surface area in square meters per gram. The surface area was determined by the well known method of Brunauer, Emmett, and Teller[1] employing the nitrogen adsorption isotherm at liquid nitrogen temperature. The pore volume was determined from the total absorption of nitrogen at liquid nitrogen temperature including that absorbed by capillary condensation.

Table 1

| Run No. | Catalyst | Conversion, Percent | | Ratio of Conv., Dec./Cetane | Average Pore Diameter, Å. | Surface Area, M²/g. |
|---|---|---|---|---|---|---|
| | | Cetane | Decalin | | | |
| 1 | Activated Carbon | 85.8 | 20.4 | 0.24 | 20.5 | 1,008 |
| 2 | 35% MgO—65% SiO₂ | 48.8 | 25.0 | 0.51 | 24 | 408 |
| 3 | 13 Al₂O₃—87 SiO₂ | 43.1 | 49.4 | 1.15 | 35 | 450 |
| 4 | 40 Al₂O₃—60 SiO₂ | 53.0 | 49.2 | 0.93 | 36.2 | 456 |
| 5 | Super-Filtrol | 42.1 | 50.1 | 1.19 | 37.5 | 332 |
| 6 | 40 Al₂O₃—40 SiO₂—20 B₂O₃ | 68.5 | 38.0 | 0.56 | 38 | 340 |
| 7 | 80 Al₂O₃—20 B₂O₃ | 57.1 | 67.5 | 1.18 | 47 | 340 |
| 8 | 100 Al₂O₃ | 28.5 | 52.9 | 1.86 | 63 | 230 |
| 9 | Cat. of Run No. 3 after approx. 500 hrs. on stream. | 29.2 | 63.3 | 2.08 | 75 | 111 |

The experiments summarized in the above table demonstrate that a definite functional relationship exists between the catalyst pore diameter and the cracking activity of the catalyst, expressed as per cent conversion, for cetane on the one hand and decalin on the other hand. As the pore diameter increased from about 20 Å. to about 75 Å. cetane conversion decreased from about 86% to about 29% decalin conversion increased from about 20% to about 60% and what is most significant, the conversion ratio decalin/cetane increased from 0.24–2.08. Since only the relative conversions of the feed materials need be considered for each catalyst, these results are independent of the surface area. Of particular interest are Runs No. 3 and 9 in which identical catalysts were used differing merely in the pore diameter as the result of extended use of the catalyst of Run No. 9 prior to its being tested in this run. In this case, an increase of the pore diameter from 35 Å.–75 Å. resulted in an increase of the conversion ratio decalin/cetane by almost 100%.

Table I shows that for paraffins, cracking activity increases as surface area increases which is in accordance with expectation. However, for naphthenes, catalyst activity increases as surface area decreases and this is against any expectation and may only be explained as the effect of the increase in pore diameter. Thus, it may be generally stated that for cracking of acyclic hydro- ---
[1] J. Amer. Chem. Soc., v. 60: 309 (1938).

carbons catalysts having high surface area should be used, which means that catalysts with small pore diameters within the ranges specified are preferable for this purpose. For cyclic hydrocarbons, increase of surface area of the catalyst has no beneficial effect below a certain pore diameter which lies in the neighborhood of about 100 Å. for double ring compounds. At or above this pore size, further improvements in conversion may be obtained in accordance with conventional relationships by increasing surface area without decreasing pore size.

Based on the findings reported above, the present invention provides for the adjustment of the pore diameter of cracking catalysts as a function of the cyclic or acyclic character of the hydrocarbon feed stock to be cracked, catalysts having average pore diameters of about 20–50 Å., preferably about 20–40 Å., being used for predominantly acyclic, particularly paraffinic, feed stocks and catalysts having pore diameters of 50–120 Å., preferably about 60–80 Å. being used for predominantly cyclic, particularly double ring naphthenic, feed stocks. The invention finds its greatest utility in the cracking of mixed paraffinic-naphthenic feed stocks, in which case a substantial improvement of the total conversion into lower boiling hydrocarbon products may be obtained by employing catalysts having a wide distribution of pore diameters throughout the approximate range of 20–120 Å. or higher.

In accordance with one embodiment of the invention, mixed feed stocks containing cyclic and acyclic constituents such as mixed naphthenic-paraffinic gas oils are cracked in a single cracking zone containing a catalyst composited of two or more constituents of the same or different chemical composition, said constituents differing substantially in pore diameter within the range of 20–120 Å. so that the pore diameters of the final catalyst composite spread over said entire range. The relative proportions of the constituents having different pore diameters depend on the composition of the feed, the proportion of constituents having pore diameters above 50 Å. being the greater the higher the concentration of cyclic hydrocarbons in the feed stock.

Mixed cyclic-acyclic cracking feed stocks of the type specified above may be cracked in two stages. In one stage, gas oil may be contacted with a catalyst of low pore diameter of, say, about 20–40 Å. to selectively convert the acyclic hydrocarbons in the gas oil. In another stage, the oil may be cracked with a catalyst of relatively high pore diameter of, say, about 60–100 Å. to selectively convert the cyclic hydrocarbons. If desired, gasoline produced in the first stage may be separated between stages.

The catalyst constituents or complete catalysts of different pore diameters may be selected among conventional cracking catalysts known to have the desired pore diameter distribution. For example, any one of the small pore diameter catalysts used in Run Nos. 1–7 of the above table may be employed as the catalyst or catalyst component for cracking selectively acyclic feed stocks or feed stock components, while the large pore diameter catalysts of Run Nos. 8–9 may serve for selectively cracking cyclic feed stocks or feed stock components in the manner described above. The pore diameter of catalysts of any given desirable chemical composition may also be controlled by a number of known procedures to obtain the desired pore size distribution. For example, the pore diameter of the gel catalysts can be controlled and adjusted by the method used in treating the material while it is still in the hydrous state during manufacture. The use of cold or acidic wash water or aging at low temperature or at low pH will, in general, cause a decrease of pore size. Freezing the hydrous gel will in many cases result in gels of very small pore diameters. On the other hand, washing with warm water and/or at a high pH or aging at high temperature and/or high pH will, in many cases, result in gels having high pore diameters. The incorporation of various organic solvent such as ketones, alcohols, etc. with the hydrous gels or the addition of various surface active agents that tend to lower the surface tension of water to the hydrous gel will frequently lead to a product having high pore diameter. Drying at low temperatures generally results in low pore diameters. Drying at high temperatures or under pressure or in an atmosphere of steam generally leads to products having a high pore diameter. The addition of fluorides, such as hydrofluoric acid, to hydrosols, particularly silica hydrosol, leads to products having very high pore diameters. Each gel catalyst should be treated as an individual case and the method of controlling pore diameter most suitable to the individual case chosen.

While the pore diameter of the catalyst is chiefly responsible for its selective activity towards cyclic or acyclic feed stocks, over-all cracking activity increases normally as the surface area of the catalyst increases. It is desirable, therefore, to prepare the catalysts for the present invention in such a manner as will lead to a high surface area along with the desired pore diameter. This may be accomplished, for example, by achieving the highest practical degree of colloidal dispersion while the gel is in the hydrous state. Thus, true hydrolsols and hydrogels are to be preferred to gelatinous precipitates in the manufacture of catalysts. Likewise, the use of dilute solutions are to be preferred over concentrated solutions in gel manufacture.

However, the preferred modification of the present invention involves the use of silica-alumina cracking catalysts of the type employed in Run Nos. 3 and 9 of the above table. These catalysts are well known composites of silica gel and alumina containing about 10–25%, preferably about 10–15% by weight of alumina. As indicated in the above table, the pore diameter of catalysts of this type may be increased from about 35 Å. of the fresh catalyst to about 75 Å. by merely subjecting the catalyst to cracking conditions, particularly in the presence of steam, for about 100–1,000 hours, particularly in a system involving continuous or periodic regeneration of the catalyst at temperatures of about 1000°–1150° F., until the catalyst has reached its equilibrium condition. Fresh catalyst of this type may, therefore, be used as the catalyst or catalyst component for the selective cracking of acyclic feed stocks or feed stock components and used catalyst of the same type for the selective cracking of cyclic, particularly naphthenic feed stocks, and feed stock components, in accordance with the invention. The striking selective cracking activities of these two modifications of the same catalyst, particularly toward the formation of gasoline range hydrocarbons from naphthenic and paraffinic gas oil range hydrocarbons, respectively, are illustrated by the experimental fixed bed data tabulated below.

*Table II*

| Catalyst | Cracking of Decalin 13 Al$_2$O$_3$—87 SiO$_2$ | | Cracking of Cetane 13 Al$_2$O$_3$—87 SiO$_2$ | |
|---|---|---|---|---|
| | Equilibrium | Fresh | Equilibrium | Fresh |
| Pore Diameter | 75 | 35 | 75 | 35 |
| Temperature, ° F | 950 | 950 | 950 | 950 |
| Pressure, p. s. i. g | 0 | 0 | 0 | 0 |
| Space Velocity, v./v./hr | 2 | 2 | 2 | 2 |
| Conversion, percent | 63.3 | 49.4 | 29.2 | 45.0 |
| Dry Gas, wt. percent | 3.9 | 7.6 | 9.0 | 13.2 |
| C$_4$, wt. percent | 4.9 | 10.4 | 7.4 | 14.5 |
| C$_5$+Naphtha $^1$ vol percent | 57.6 | 38.8 | 14.2 | 17.4 |

$^1$ Converted products only.

The above data demonstrate the excellent utility of this preferred catalyst in the fresh and equilibrium states for the selective cracking of cyclic and acyclic hydrocarbon oils in accordance with the present invention.

The catalytic cracking in accordance with the invention may be carried out at conventional conditions including temperatures of about 700°–1100° F., pressures ranging from subatmospheric up to several hundred pounds, and contact times of about 0.5–20 seconds, all properly correlated to suit the particular feed stock and catalyst involved. The catalyst may be regenerated by a treatment with oxidizing gases such as air, oxygen, steam, flue gases, or mixtures thereof to remove carbonaceous deposits in a manner known per se. When using mixed fresh and used silica-alumina catalyst, it is usually desirable to add fresh catalyst component continuously at a rate of about 0.5–5% of total catalyst inventory per day, in an operation involving high temperature regeneration of the catalyst. When operating in two stages containing catalysts of different pore diameters, the cracking conditions in the individual stages may be adjusted so as to be optimum for the cracking of naphthenic and paraffinic hydrocarbons, respectively, the latter normally requiring more severe cracking conditions than the former, within the ranges just specified.

The invention will be further illustrated by the following specific example. Two silica-alumina catalysts of identical composition, 13% alumina–87% silica, are prepared by well known procedures as follows: A silica hydrosol is prepared by carefully mixing sulfuric acid and sodium silicate solutions. The hydrosol is allowed to set to a hydrogel which latter is washed free of soluble salts with water. The washed hydrogel is impregnated by soaking in an aluminum sulfate solution. Alumina is precipitated in the gel by treatment with ammonia. The impregnated gel is rewashed with water to free it of soluble salts and dried and activated by heating to about 850° F. A catalyst A having an average pore diameter of about 26 Å. is prepared according to the above procedure wherein the washing is conducted with cold water acidified by the addition of hydrochloric acid; the temperature in both washing steps is in the range of 40°–60° F. and the pH is in the range of 3–4 in the washing of the silica hydrogel and in the range of 4.5–5.5 in the washing of the hydrogel after impregnation. A catalyst B having an average pore diameter of about 70 Å. is prepared according to the above procedure wherein the washing is conducted with warm water made alkaline by the addition of ammonia: in both washing steps the temperature is in the range of 120°–140° F. and the pH in the range of 7.5–8.5.

These two catalysts are used to crack two gas oils C and D of widely different type boiling in the range of about 530°–800° F. Gas oil C is a highly naphthenic stock analyzing 60% ring structures and 40% acyclic hydrocarbons and side chains. Gas oil D is a more paraffinic material analyzing 30% cyclic structures and 70% acyclic hydrocarbons and side chains. The cracking conditions employed are 950° F., 0 p. s. i. g., and 2 v./v./hr. in fixed bed operation. The following results are obtainable at these conditions.

|  | Percent Conversion to Cracked Products ||
|  | Gas Oil C | Gas Oil D |
| --- | --- | --- |
| Catalyst A | 45–55 | 50–60 |
| Catalyst B | 50–60 | 40–50 |
| Mixture of 40% Cat. A plus 60% Cat. B | 60–65 | 55–60 |
| Mixture of 70% Cat. A plus 30% Cat. B | 55–60 | 60–65 |

Further experimental data indicate that with respect to cyclic hydrocarbons, particularly aromatic hydrocarbons, containing more than two carbon rings per molecule, catalyst pore diameters substantially in excess of 120 Å., say pore diameters of about 200–400 Å., may be required for best results. In general, it may be stated that for hydrocarbons of this type boiling within the range of about 400°–900° F. or higher, the pore diameter of the cracking catalyst should be the greater within the range of about 120–400 Å. the higher the molecular weight of the hydrocarbons.

The process of the invention may be carried out in any of the systems well known in the art of catalytic cracking, that is, in fixed bed, moving bed, fluid catalyst or suspensoid operation, as will be fully understood by those skilled in the art.

The foregoing description and exemplary operations have served to illustrate preferred embodiments of the invention but are not intended to be limiting in scope.

What is claimed is:

1. In the catalytic cracking of predominantly paraffinic hydrocarbon oil to form lower boiling hydrocarbons in which the oil in the presence of a silica gel-alumina type catalyst is subjected to conversion temperatures and pressures to effect cracking of the oil, followed by recovery of the cracked product, the improvement which comprises using a silica gel-alumina type catalyst characterized by an average pore diameter of 20 to 40 Angstroms so as to preferentially crack the paraffinic hydrocarbons and leave the naphthenic hydrocarbons substantially unchanged.

2. In the catalytic cracking of predominantly naphthenic hydrocarbon oil to form lower boiling hydrocarbons in which the oil in the presence of silica gel-alumina type catalyst is subjected to conversion temperatures and pressures to effect cracking of the oil, followed by recovery of the cracked product, the improvement which comprises using a silica gel-alumina type catalyst characterized by an average pore diameter of 60 to 120 Angstroms so as to preferentially crack the naphthenic hydrocarbons and leave the paraffinic hydrocarbons substantially unchanged.

3. In the catalytic cracking of mixed naphthenic-paraffinic hydrocarbons to form lower boiling hydrocarbons in which the oil in the presence of a silica gel-alumina type catalyst is subjected to conversion temperatures and pressures to effect cracking of the oil, followed by recovery of the cracked product, the improvement which consists of using a blend of two silica gel-alumina type catalysts, one of which has an average pore diameter of 60 to 100 Angstroms which will preferentially crack the naphthenic hydrocarbons leaving the paraffinic hydrocarbons substantially unchanged and the other of which has an average pore diameter of 20 to 40 Angstroms which will preferentially crack the paraffinic hydrocarbons and leave the naphthenic hydrocarbons substantially unchanged, the quantity of 60 to 100 Angstroms and 20 to 40 Angstroms pore size catalyst employed in the cracking process being a function of the amount of naphthenic and paraffinic hydrocarbons present in the feed stock.

References Cited in the file of this patent

UNITED STATES PATENTS

| Number | Name | Date |
| --- | --- | --- |
| 2,300,106 | Connolly | Oct. 27, 1942 |
| 2,385,216 | Marancek | Sept. 18, 1945 |
| 2,531,356 | Evans | Nov. 21, 1950 |
| 2,631,968 | Peery | Mar. 17, 1953 |

OTHER REFERENCES

Pore-Size Distribution in Porous Material, Drake, Ind. and Eng. Chem., April 1949, vol. 41, pages 780–785.